(12) United States Patent
Sprayberry

(10) Patent No.: US 6,309,718 B1
(45) Date of Patent: *Oct. 30, 2001

(54) LARGE POLYESTER CONTAINERS AND METHOD FOR MAKING SAME

(75) Inventor: Harold Blake Sprayberry, Kingsport, TN (US)

(73) Assignee: Eastman Chemical Company, Kingsport, TN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/106,294

(22) Filed: Jun. 29, 1998

Related U.S. Application Data

(60) Provisional application No. 60/053,717, filed on Jul. 25, 1997.

(51) Int. Cl.$^7$ .............................. B65D 1/02; C08L 67/02
(52) U.S. Cl. ..................... 428/35.7; 428/36.92; 528/271; 528/272
(58) Field of Search ................................ 428/35.7, 36.92; 528/271, 272

(56) References Cited

U.S. PATENT DOCUMENTS

| | | | |
|---|---|---|---|
| 5,217,128 | 6/1993 | Stenger | 215/1 C |
| 5,352,401 | * 10/1994 | Dalgewicz et al. | 264/331.11 |
| 5,409,983 | 4/1995 | Jones et al. | |
| 6,060,140 | * 5/2000 | Sprayberry et al. | 428/36.9 |

FOREIGN PATENT DOCUMENTS

| | | |
|---|---|---|
| 0 278 403 A2 | 8/1988 | (EP). |
| WO 90/03993 A1 | 4/1990 | (WO). |
| WO 91/08247 A1 | 6/1991 | (WO). |
| WO 94/01268 A1 | 1/1994 | (WO). |
| WO 95/03977 A1 | 2/1995 | (WO). |
| WO 96/33062 A1 | 10/1996 | (WO). |

* cited by examiner

*Primary Examiner*—Harold Pyon
*Assistant Examiner*—Sandra M. Nolan
(74) *Attorney, Agent, or Firm*—Karen A. Harding; Bernard J. Graves, Jr.

(57) ABSTRACT

The present invention relates to a large molded polyester container weighing greater than about 200, and preferably between about 200 and about 800 grams. Specifically, the present invention relates to polyester containers having a volume of several gallons. In one embodiment the container is a bottle formed from a diacid component comprising up to about 96.5 mol % terephthalic acid or naphthalene dicarboxylic acid and a glycol component, wherein said polyester possesses an IV of about 0.75 to about 0.85.

13 Claims, No Drawings

LARGE POLYESTER CONTAINERS AND METHOD FOR MAKING SAME

CROSS REFERENCE TO RELATED APPLICATIONS

This application claims the benefit of U.S. Provisional Application Ser. No. 60/053,717 filed Jul. 25, 1997.

FIELD OF THE INVENTION

The present invention relates to polyester compositions suitable for making large (1–10 gallon) stretch blow molded containers. A process for making large containers is also disclosed.

BACKGROUND OF THE INVENTION

Standard PET bottle polymer typically has an intrinsic viscosity, or IV in the range of 0.76 to 0.84 dl/g. Copolymer modification (acid or glycol) has been used to decrease the crystallization rate and widen the injection molding processing window. Standard PET bottle polymers with copolymer modification typically have between 0% and 6% IPA modification, or 0% and 3% CHDM modification in order to reduce the crystallization rate and allow the production of clear preforms weighing up to 100 grams.

Processing equipment and technology have been developed to produce stretch blow molded bottles weighing up to 800 grams specifically for the bulk delivered bottled water market. The use of stretch blow molding technology provides advantages in production output and bottle thread finish quality. However, this equipment has been limited to the use of amorphous resins, such as polycarbonate, in order to maintain the desired clarity in the preforms and bottles.

The use of a crystallizable polyester, such as PET, in a stretch blow molded application can give important advantages when compared to the use of an amorphous polymer. Specifically, the crystallizable polyester can be oriented, or mechanically stretched to give dramatically improved mechanical properties and crack resistance at reduced bottle weight. Using standard PET bottle polymer formulations in these large containers, however, results in the either the formation of crystalline haze in the thicker areas of the bottle, or a very narrow processing window during the production of the preforms and bottles.

DESCRIPTION OF THE INVENTION

The present invention relates to large stretch blow molded polyester containers, generally weighing between about 200 and about 800 grams. The containers of the present invention are generally capable of holding several gallons, specifically from about one to about 10 gallons, and preferably from greater than about two gallons to about 10 gallons. Specifically containers of the present invention are formed from polyesters formed from a diacid component comprising up to about 96.5 mol % terephthalic acid or naphthalene dicarboxylic acid and a glycol component, wherein said polyester possesses an IV of about 0.75 to about 0.85. The disclosed polyesters have improved crystallization and stretching characteristics.

The compositions of the present invention generally possess an IV of about 0.75 to about 0.85 and copolymer modification of about about 3.5 mol % up to about 20 mol %. More specifically, the compositions of the present invention comprise copolymer modifications of about 4 mol % to about 10 mol % CHDM; about 6 mol % to about 17 mol % IPA and mixtures thereof (higher than that of standard PET bottle polymer). The net effect was a PET bottle polymer with significantly reduced crystallization rate, increased stretch ratios, and otherwise acceptable processing performance. It should be understood that the desired crystallization and stretching characteristics can be obtained using any combination of IV and modification, such as higher IV and lower copolymer modification or lower IV and higher copolymer modification.

Polyesters with optimized crystallization and stretching characteristics have been shown to possess the processing characteristics necessary to make 5 gallon, stretch blow molded PET bottles with excellent physical properties and acceptable bottle appearance (clarity). The decreased crystallization rate results in the ability to injection mold clear thick-walled preforms at the desired processing conditions. The higher stretch ratios result in enough orientation to give the bottles excellent physical properties, even at the lower blow molding temperatures necessary for avoiding the formation of crystalline haze during the blow molding process for large, greater than about 200, preferably greater than about 600 gram containers.

Any polyester composition which is suitable for making a bottle may be utilized so long as the appropriate amount of copolymer modification is present. Examples of suitable polyesters include poly(ethylene terephthalate), poly (ethylene naphthalenedicarboxylate) comprising about 4 mol % to about 10 mol % CHDM, or about 6 mol % to about 17 mol % IPA, and mixtures thereof. The polyester compositions suitable for the present invention may also containing up to about 50 mol % of modifying dibasic acids and/or glycols other than CHDM and IPA, and more preferably up to about 20% and most preferably up to about 10 mol %. Modifying dibasic acids may contain from about 2 to about 40 carbon atoms, and preferably include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Examples of dicarboxylic acids to be included with naphthalenedicarboxylic acid are: terephthalic acid, phthalic acid, naphtbalene-2,-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

The glycol component of the present invention comprises about 4 mol % to about 10 mol % CHDM and from about 10 to about 94 mol % ethylene glycol. The glycol component may be further modified with additional modifying glycol components which include, but are not limited to cycloaliphatic diols preferably having 6 to 20 carbon atoms or aliphatic diols preferably having 3 to 20 carbon atoms. Examples of such diols include diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1, 3), 2-ethylhexanediol-(1,3), 2,2-diethylpropane-diol-(1,3), hexanediol-(1,3), 1,4-di-(hydroxyethoxy)-benze, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis4-hydroxypropoxyphenyl)-propane. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Highly useful naphthalenedicarboxylic acids include the 2,6-, 1,4-, 1,5-, or 2,7-isomers but the 1,2-. 1.3-, 1,6-, 1,7-, 1,8-, 2,3-, 2,4-, 2,5-, and/or 2,8-isom may also be used.

The dibasic acids may be used in acid form or as their esters such as the dimethyl esters for example.

The polyesters of this invention are readily prepared using polycondensation reaction conditions well known in the art. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present. Although we prefer to use continuous polycondensation reactors, batch reactors operated in series may also be used.

Other components such as nucleating agents, branching agents, colorants, pigments, fillers, antioxidants, ultraviolet light and heat stabilizers, impact modifiers, reheat improving aids, crystallization aids, acetaldehyde reducing additives and the like may be used if desired and to the extent they do not impair the objectives of the present invention.

Bottles of the present invention are produced using a stretch blow molding process. Stretch blow molding is accomplished in two distinct steps; first, the polyester is melted in an extruder and injected into a mold forming a preform or parison; second, the preform is then blown into the final bottle shape. The actual blowing of the preform must occur at a temperature slightly above the glass transition temperature of the polyester. In a "single stage" SBM process the preform is transferred from the injection mold directly to a blow molding station; during the transfer time, the preform cools to the proper blow molding temperature. In a "two stage" SBM process the preform is ejected from the injection mold and then held at ambient temperatures for a time long enough to achieve a consistent temperature within the lot of preforms; and then, in a separate process, is reheated to the proper blow molding temperature before being blown into the bottle shape. The specific type of process used is determined by the volume of production, or the production rate desired for a specific application; and the machine design and capabilities.

It is well known that polyesters exhibit a dramatic improvement in physical properties when mechanically stretched, or oriented. During the SBM process with a crystallizable polymer, this mechanical stretching occurs when the preform is blow molded into the final bottle shape. Preform design and SBM processing conditions are used to impart the desired level of mechanical stretching (stretch ratio) to the bottle sidewalls and base; and thus determine many of the bottle physical properties. These physical properties are generally much improved over those found in containers which have not been mechanically oriented, such as those containers made from an amorphous polymer. Planar stretch ratios ranging from approximately 11 to 13 are commonly used in polyester bottles that require excellent physical properties, and are considered standard practice in the industry.

To gain the advantages of increased mechanical orientation and to reduce raw material costs, bottle manufacturers and equipment suppliers are beginning to investigate methods and equipment for producing large SBM containers in sizes ranging from 1 to 10 gallons. However, the tendency of standard PET bottle polymer to form crystalline haze during the injection molding of thick walled preforms, and the tendency to form crystalline haze at the high blow molding temperatures needed to achieve the desired stretch ratios during the blow molding of large containers have limited the use of PET in these large SBM applications. Bottle producers have been forced to use amorphous polymers, such as polycarbonate, in the SBM process, which results in significantly higher raw material costs and little or no increase in physical properties typically derived from mechanical orientation.

The efforts to produce very large containers using the stretch blow molding process have been hampered not only by the crystallization characteristics, but also by the stretching characteristics of standard PET formulas and their effect on processing. In order to make a very large PET container, the preform must be designed with the correct range of dimensions that allow the production of a bottle with the desired material distribution and thickness, and also give an acceptably wide processing window in both the injection molding and blow molding steps. The PET preform can be said to have a "natural stretch ratio", or NSR at a given blow molding temperature; at which point the PET begins to self-level and strain harden. Stretching beyond the NSR at a given blow molding temperature imparts improved physical properties, but too much stretching causes a loss of clarity and delaminating (typically called pearlesence, or pearl point). The stretching characteristics of PET are highly dependent on several resin factors, primarily: IV (molecular weight), and copolymer content. In general, as the IV decreases and copolymer content increases, the NSR and the temperature at which pearlesence begins increases. By increasing the NSR of PET for use in large SBM containers, it is then possible to achieve proper material distribution and mechanical orientation at a lower blow molding temperature than would be expected with standard PET bottle polymers. This results in the ability to use optimally designed preforms and to avoid the formation of crystalline haze during the blow molding process for large SBM containers.

The polyesters of the present invention display superior crystallization (reduced crystallization rate, haze formation, etc.) and stretching characteristics (higher natural stretch ratio, increased freeblow volume, etc), which permit (or increase the processing window for) the production of large stretch blow molded (mechanically oriented) PET bottles using stretch blow molding (SBM) equipment or SBM equipment technology. The bottles of the present invention display increased clarity, improved physical properties, and improved.processability which allows the production of large containers.

Large bottles which have surprisingly good physical properties and clarity are also disclosed. Accordingly, the present invention firther relates to containers which are made from polyester formed by balancing the IV with copolyester modification and preferably, comprising an IV of about 0.75 to about 0.85 dl/g and from about 3.5 mol % up to about 20 mol % copolymer modification. The bottles of the present invention display surprisingly good physical properties and the desired level of clarity, as well as improved processing characteristics and production output.

The reduction of crystallization rate allows the use of crystallizable polyesters in the production of extremely large containers on stretch blow molding equipment; which results in an opportunity to improve physical properties by increased mechanical stretching, or orientation, while maintaining the desired container clarity. The increased copolymer modification not only decreases the crystallization rate, but also increases the natural stretch ratio at lower blow molding temperatures. This increase in natural stretch ratio is important in order to optimize the preform design for good material distribution and acceptable orientation, while keeping the blow molding temperature low enough to avoid the formation of crystalline haze during the blow molding stage of production.

Specifically the present invention relates to a large container which is crystallized and biaxially oriented, such as by strectch blow molding and formed from the above disclsosed polyester.

The present invention further relates to a process for forming large containers comprising providing a polyester having the above defined composition, a hoop stretch ratio at 212° F. of greater than about 5.0 and a crystallization halftime sufficient to injection mold a thick walled preform without the formation of crystalline haze. The process further comprises the step of stretch blow molding said preform under conditions suitable to form said bottle without forming crystalline haze during said blow molding step.

What is claimed is:

1. A stretch blow molded polyester container weighing greater than about 200 grams, being substantially free from crystalline haze wherein said polyester is formed from poly(ethylene terephthalate) or poly(ethylene naphthalenedicarboxylate) comprising about 4 mol % to about 10 mol % cyclohexane dimethanol, or about 6 mol % to about 17 mol % isophthalic acid, or mixtures thereof, wherein said polyester possesses an intrinsic viscosity of about 0.75 dl/g to about 0.85 dl/g.

2. The container of claim 1 wherein said diacid further comprises up to about 50 mol % of modifying dibasic acids other than isophthalic acid.

3. The container of claim 1 wherein said diacid furher comprises up to about 20 mol% of modifing dibasic acids other than isophthalic acid.

4. The container of claim 1 wherein said diacid further comprises up to about 10 mol % of modifying dibasic acids other than isophthalic acid.

5. The container of claim 2 wherein said modifying dibasic acid is selected from the group consisting of aromatic dicarboxylic acids having 8 to 14 carbon atoms, aliphatic dicarboxylic acids having 4 to 12 carbon atoms, or cycloaliphatic dicarboxylic acids having 8 to 12 carbon atoms.

6. The container of claim 5 wherein said modifying dibasic acid is selected from the group consisting of phthalic acid, terephthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and mixtures thereof.

7. The container of claim 1 wherein said glycol component further comprises modifying glycols selected from the group consisting of cycloaliphatic diols having 6 to 20 carbon atoms or aliphatic diols having 3 to 20 carbon atoms.

8. The container of claim 7 wherein said modifying glycol is selected from the group consisting of diethylene glycol, triethylene glycol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentpme-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and mixtures thereof.

9. A method for making a container comprising forming a preform from between about 200 and about 800 grams of a polyester formed from a diacid component comprising up to about 96.5 mol % terephthalic acid or naphthalene dicarboxylic acid and a glycol component comprising ethylene glycol, wherein said polyester possesses an intrinsic viscosity of about 0.75 to about 0.85; and stretch blow molding said preform into a container.

10. The method of claim 9 wherein said diacid component further comprises from about 6 mol % to about 17 mol % isophthalic acid.

11. The method of claim 10 wherein said glycol component further comprises from about 4 mol % to about 10 mol % cyclohexanedimethanol.

12. The method of claim 10 wherein said diacid further comprises up to about 50 mol % of modifying dibasic acids other than isophthalic acid.

13. The method of claim 11 wherein said glycol component further comprises modifying glycols selected from the group consisting of cycloaliphatic diols having 6 to 20 carbon atoms or aliphatic diols having 3 to 20 carbon atoms.

* * * * *

UNITED STATES PATENT AND TRADEMARK OFFICE
CERTIFICATE OF CORRECTION

PATENT NO. : 6,309,718 B1
DATED : October 30, 2001
INVENTOR(S) : Harold Blake Sprayberry It is certified that error appears in the above-identified patent and that said Letters Patent is hereby corrected as shown below:

<u>Column 6, claim 8,</u>
Line 15, "2,2,4-trimethylpentpme-diol-" should be -- 2,2,4-trimethylpentane-diol- --

Signed and Sealed this

Twenty-sixth Day of March, 2002

*Attest:*

JAMES E. ROGAN
*Attesting Officer*     *Director of the United States Patent and Trademark Office*